Figure 1:
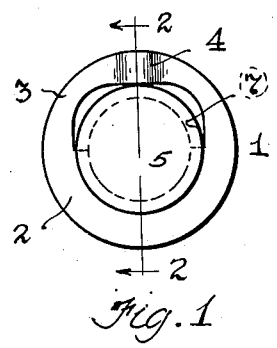

April 3, 1928.

R. F. KREJCI

RETAINING DEVICE

Filed Dec. 31, 1926

1,664,890

INVENTOR.
Robert F. Krejci
BY
Fay, Oberlin + Fay
ATTORNEYS.

Patented Apr. 3, 1928.

1,664,890

UNITED STATES PATENT OFFICE.

ROBERT F. KREJCI, OF CLEVELAND, OHIO.

RETAINING DEVICE.

Application filed December 31, 1926. Serial No. 158,231.

This invention as indicated relates to a retaining device. More particularly it comprises a securing device adapted to be engaged within a groove at the end of a pin or bolt or equivalent member, and to be positively locked upon such member. Said device may be an independent element to be used in substitution for a nut, lock nut, or cotter pin, or may be incorporated as part of the structure of a sheet metal strip or plate. It also is adapted to be made a part of the strip receiving a series of pins or other members and locking such series through the straightening of the retaining portion of the device.

In connection with the quantity production of manufactured articles, saving of labor costs is of great importance and where automatic machinery is utilized it has been found that bolts and pins may be more easily provided with circumferential grooves than with transverse apertures. When cotter pins are used it is necessary that transverse apertures be formed through the member to receive the cotter pin and usually this involves an additional machining operation from that of making the pin or bolt or other part to which the cotter pin is to be applied. Also in the course of assembling it has been found that cotter pins require more time for attachment than where the fastening operation merely involves the positioning of a retaining washer or equivalent part to move the locking portion thereof into proper position.

The principal object of the present invention is to provide a retaining device which is of extremely simple construction and capable of manufacture in large quantities at a trifling cost. Another object of the invention is to provide a device adapted for application to pins, bolts or similar members which may be grooved to receive such retaining device simultaneously with the operation of cutting such members to proper length. Another object of the invention is to provide a retaining member which will eliminate the necessity of drilling and burring cotter pin holes in studs, pins and bolts, or similar members. A further object of the invention is to provide a retaining device which will present 180° of direct thrust service and which may be positively secured in position by a single movement. A still further object of the invention is to provide a washer having a minimum of frictional surface for a moving part with a maximum shearing section to resist displacement. Other and further objects of the invention will appear in the course of the following description. To the accomplishment of the foregoing and related ends, said invention, then consists of the means hereinafter fully described and particularly pointed out in the claims.

The annexed drawing and the following description set forth in detail certain structure embodying the invention, such disclosed means constituting, however, but one of various structural forms in which the principle of the invention may be used.

Figure 2:
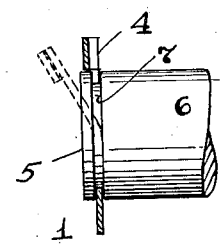
Figure 4:
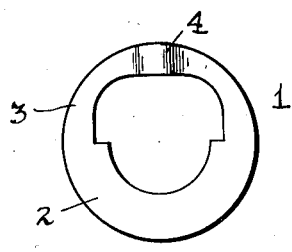
Figure 3:
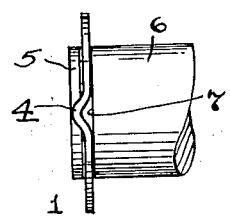
Figure 5:
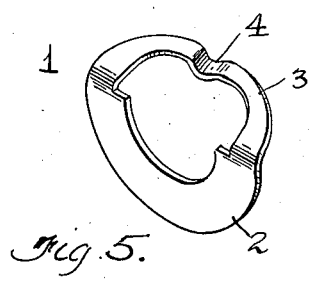

In said annexed drawing:

Fig. 1 is an end elevation of a member engaged by a retaining device embodying the principles of my invention; Fig. 2 is a side elevation partly in section of the device shown in Fig. 1 taken along the line 2—2, looking in the direction of the arrows, the first position of the locking section being engaged in dotted lines; Fig. 3 is a top plan view of the parts shown in Fig. 1; Fig. 4 is a front elevation of a retaining washer constructed in accordance with the princiles of my invention, the portions thereof being shown in applied position, and Fig. 5 is a perspective view showing a retainng washer with the locking portion thereof angularly disposed, preliminary to the application of the device to the grooved end of a pin or bolt.

The device will be described in connection with a retaining washer, but it is to be understood that it is not intended to limit the application of the device to a washer inasmuch as the princiles of the invention, as heretofore indicated, are applicable to the construction of retaining devices of various kinds which may be formed in metal strips or plates which are parts of casings or machines or other structures quite as effectively as in the form of washers. It should also be mentioned that the outside contour in no way affects the effectiveness of the retaining features of the device.

As is clearly shown in the drawing, the washer 1 comprises a disc of sheet metal centrally perforated with an aperture, laid out on one radius adjacent one semi-circumferential portion and laid out upon a larger radius adjacent the opposite semi-circumferential portion, thus providing an annular member having a wide body portion 2 of semi-circular extent, and a narrow body portion 3 of like extent continuous therewith. The narrow body portion is crimped or formed with a radially extending rib 4 at a central point and said narrow body portion is displaced outwardly from the plane of the wide body portion a distance adequate to admit the end section 5 of a pin or bolt 6 beyond the securing groove 7 formed thereabout.

As is clearly shown in Figs. 1 to 3 of the drawing, the pin or bolt comprises a standard cylindrical body portion adjacent one or both ends of which a circumferential groove spaced a slight distance from the end, is provided. Said groove is of slightly greater width than the thickness of the retaining washer and is of a depth to provide a cylindrical portion of slightly less radius of curvature than the inside margin of the wide portion of the retaining washer.

The diameter of the opening in the retaining washer having the rib formed therein, measured from the inner edge of the wide portion to the opposite inner edge of the narrow portion of said washer, is less than the total diameter of the pin by a distance slightly less than the depth of the circumferential groove.

The method of applying the washer to the pin will be readily apparent. The narrow portion of the washer, as stated, is displaced from the plane of the wider portion, a distance sufficient to clear the end section of the pin beyond the groove and thus permits the insertion of the inner edge of the wide section of the washer into the groove in close conformity with the curvature of the body of a pin at the base of the groove. When so inserted the narrow portion of the rim of the washer will just clear the end portion of the pin. The rib on said narrow portion preferably projects outwardly when the washer is engaged over the pin. When the wider portion of the washer is fully seated in the groove, the person applying the same to the body member forces the narrow section of the washer to a position in substantially the same plane of the wider portion thereof. The rib or projecting portion of the washer will obviously not be moved into the plane of the wider portion because of its construction but will overlie the body portion of the pin between the groove and the end of said member. The inner margin of the rib section will therefore contact with the metal between the groove and the end of the body member and will prevent the inner section of the wider portion of the retaining member from being withdrawn from the groove. Inasmuch as the rib has been faced outwardly toward the end of the pin, any part retained upon said pin will not come into frictional contact with the projecting portion but will bear against the perfectly flat inner face of the retaining member including all of the wider portion thereof and the greater portion of the narrow section thereof excepting that which is displaced from the plane of said member at the point of formation of the rib. Thus no wear upon the rib will occur and there will be no tendency on the part of the mechanism to disengage the retaining member from the pin.

As has been stated, under modern speed production methods, the cost of labor is the highest factor to be considered. Where cotter pins are used as fastening elements, it has been found that the insertion of such pins and bending the ends thereof in place, consumes more time than would be required for the attachment of the retaining washers of the type herein described. A much larger saving, however, will be found in the manufacturing cost of the parts to which the washer is applied. Where a hole has to be drilled through the end of a pin or bolt, an operation additional to the cutting of the pin or bolt to the proper length, is required. This additional operation may be dispensed with where automatic machines are used to cut the pins or bolts to the proper length, as the groove may be formed simultaneously with the cutting off operation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An article of the character described having in combination, a pin provided with a circumferential groove closely adjacent one end, a disc of thin bendable sheet metal having an aperture of less than the cross sectional area of the pin, said disc having portions angularly related to each other, one of said portions providing a flange of semi-circular extent adjacent said aperture, and adapted to be engaged within the groove on said pin, and the opposite portion of said disc being free of said flange and provided with a laterally off-set member which engages the exterior surface of the end of the pin when the adjacent portion of the disc is bent into the plane of the groove.

2. A retaining device adapted to cooperate with a pin having a circumferential groove adjacent its end and comprising a disc having an aperture of less than the cross sectional area of the pin, said disc having portions angularly related to each other, one of said portions providing a flange of semicircular extent adjacent said aperture adapted to be engaged within the groove on said pin and the opposite portion of said disc being free of said flange and provided with a laterally offset member adapted to engage the exterior surface of a pin when the flange is engaged with a groove and the opposite portion is bent into the plane of the flange portion of the disc.

Signed by me this 19th day of August, 1926.

ROBERT F. KREJCI.